United States Patent
Lepape

(10) Patent No.: US 7,768,301 B2
(45) Date of Patent: Aug. 3, 2010

(54) RECONFIGURABLE INTEGRATED CIRCUITS WITH SCALABLE ARCHITECTURE INCLUDING A PLURALITY OF SPECIAL FUNCTION ELEMENTS

(75) Inventor: Olivier V. Lepape, Paris (FR)

(73) Assignee: Abound Logic, S.A.S., Bievres (FR)

( * ) Notice: Subject to any disclaimer, the term of this patent is extended or adjusted under 35 U.S.C. 154(b) by 70 days.

(21) Appl. No.: 12/174,565

(22) Filed: Jul. 16, 2008

(65) Prior Publication Data

US 2009/0009216 A1 Jan. 8, 2009

Related U.S. Application Data

(63) Continuation-in-part of application No. 11/840,848, filed on Aug. 17, 2007, now Pat. No. 7,498,840, which is a continuation of application No. 11/333,191, filed on Jan. 17, 2006, now Pat. No. 7,274,215.

(51) Int. Cl.
*H03K 19/177* (2006.01)
(52) U.S. Cl. .......................................... 326/41; 326/47
(58) Field of Classification Search ............. 326/38–41; 716/12–13
See application file for complete search history.

(56) References Cited

U.S. PATENT DOCUMENTS

| | | | |
|---|---|---|---|
| 5,258,668 A | | 11/1993 | Cliff |
| 5,436,574 A | | 7/1995 | Veenstra |
| 5,612,891 A | * | 3/1997 | Butts et al. .................. 716/16 |
| 5,631,576 A | | 5/1997 | Lee |

(Continued)

FOREIGN PATENT DOCUMENTS

EP 0919938 6/1999

(Continued)

OTHER PUBLICATIONS

Hauck, S., "The Roles of FPGA's in Reprogrammable Systems," Proceedings of the IEEE, Apr. 1998, vol. 86, No. 4, pp. 615-638.

(Continued)

*Primary Examiner*—Vibol Tan
(74) *Attorney, Agent, or Firm*—Schwabe, Williamson & Wyatt, P.C.

(57) ABSTRACT

An integrated circuit (IC) includes a number of function blocks (FB), of which at least one is re-configurable. Each of the FBs may be a reconfigurable function or a non-reconfigurable function or recursively expanded with additional "nested" function blocks. The IC further includes a number of input pins, a number of output pins, an adder, and a number of crossbar devices. The elements, at least at the IC level, are coupled in a manner such that all input signals are provided to the FBs through a first subset of the crossbar devices, all internal signals are routed from one FB to another FB through a second subset of crossbar devices, and all output signals are routed from the FBs to the output pins through a third subset of crossbar devices. To increase routability and speed each of the crossbar device output has a single fanout. Additionally, each of the crossbar devices may provide only one input to each other crossbar device. In some embodiments, an FB may include special function elements, and optionally, (cascaded) selection paths. Other embodiments may also be described.

22 Claims, 14 Drawing Sheets

U.S. PATENT DOCUMENTS

| | | | |
|---|---|---|---|
| 5,661,662 A | 8/1997 | Butts | |
| 5,848,005 A | 12/1998 | Cliff | |
| 6,018,490 A | 1/2000 | Cliff | |
| 6,181,162 B1* | 1/2001 | Lytle et al. | 326/41 |
| 6,294,928 B1 | 9/2001 | Lytle | |
| 6,356,109 B1 | 3/2002 | Furuta | |
| 6,492,834 B1* | 12/2002 | Lytle et al. | 326/41 |
| 6,594,810 B1 | 7/2003 | Reblewski | |
| 6,940,308 B2* | 9/2005 | Wong | 326/41 |
| 7,042,248 B1* | 5/2006 | Hutton et al. | 326/41 |
| 7,057,412 B1* | 6/2006 | Burney | 326/38 |
| 7,149,996 B1* | 12/2006 | Lysaght et al. | 716/16 |
| 7,224,184 B1* | 5/2007 | Levi et al. | 326/41 |
| 7,256,611 B2* | 8/2007 | Holberg et al. | 326/41 |
| 7,324,537 B2 | 1/2008 | Samudrala et al. | |
| 7,391,234 B2* | 6/2008 | Fujisawa et al. | 326/38 |
| 2004/0075469 A1 | 4/2004 | Reblewski | |
| 2004/0150422 A1* | 8/2004 | Wong | 326/41 |
| 2004/0178820 A1* | 9/2004 | Barbier et al. | 326/40 |
| 2004/0187088 A1 | 9/2004 | Cambonie | |
| 2007/0046326 A1 | 3/2007 | Fujisawa | |
| 2007/0194807 A1 | 8/2007 | Reblewski et al. | |

FOREIGN PATENT DOCUMENTS

| | | |
|---|---|---|
| WO | 03032492 | 4/2003 |

OTHER PUBLICATIONS

International Search Report and Written Opinion of the International Searching Authority for PCT/EP2007/050467, mailed Jun. 21, 2007, 12 pages.

* cited by examiner

Reconfigurably routing a plurality of data signals to a plurality of reconfigurable logic elements as well as a plurality of special function elements
1410

Selecting outputs from the reconfigurable or special function elements
1420

Reconfigurably routing the selected outputs to the plurality of reconfigurable logic elements as well as the plurality of special function elements
1430

RECONFIGURABLE INTEGRATED CIRCUITS WITH SCALABLE ARCHITECTURE INCLUDING A PLURALITY OF SPECIAL FUNCTION ELEMENTS

CROSS-REFERENCE TO RELATED APPLICATIONS

The present application is a continuation-in-part application of U.S. patent application Ser. No. 11/840,848, filed Aug. 17, 2007 now U.S. Pat. No. 7,498,840, which is a continuation of U.S. patent application Ser. No. 11/333,191, filed Jan. 17, 2006, now U.S. Pat. No. 7,274,215, issued Sep. 25, 2007, both of which are hereby incorporated by reference in their entirety.

TECHNICAL FIELD

The present invention relates to the field of integrated circuit (IC). More specifically, the present invention relates to the architecture of reconfigurable ICs.

BACKGROUND

The art of design and manufacturing ICs is generally known. Over the years, as the technology of designing and manufacturing ICs continues to improve, increasing number of electronic elements are being packed into a single IC, and the interrelationship between these elements are increasingly complex. With increased density and complexity, the cost for making an IC manufacturing mask has increased substantially correspondingly.

Between different offerings of a modern IC product family, or between successive offerings, often times the functionalities are different only in a relatively small incremental way, when viewed in the context of the totality of its logic. Thus, in view of the high cost of a new IC mask as well as other factors, increasingly IC designers desire to have ICs that are partially reconfigurable to accommodate the small incremental changes in functionalities between the different offerings.

U.S. Pat. No. 5,574,388 discloses a reconfigurable IC designed for emulation application. The architecture including in particular the integrated debugging facilities was particularly suitable for the intended use. However, general purpose partially reconfigurable integrated circuits present a different set of challenges. One desirable attribute is scalability to provide more flexible tradeoffs between area consumption versus routability.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 14 illustrates a flow chart view of selected operations of the reconfigurable function block of FIG. 10 in accordance with various embodiments.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B and C" means "(A), (B), (C), (A and B), (A and C), (B and C) or (A, B and C)". For the purposes of the present invention, the phrase "(A)B" means "(B) or (AB)" that is, A is an optional element.

The description may use the phrases "in one embodiment," or "in embodiments," which may each refer to one or more of the same or different embodiments. Furthermore, the terms "comprising," "including," "having," and the like, as used with respect to embodiments of the present invention, are synonymous.

Figure 1:
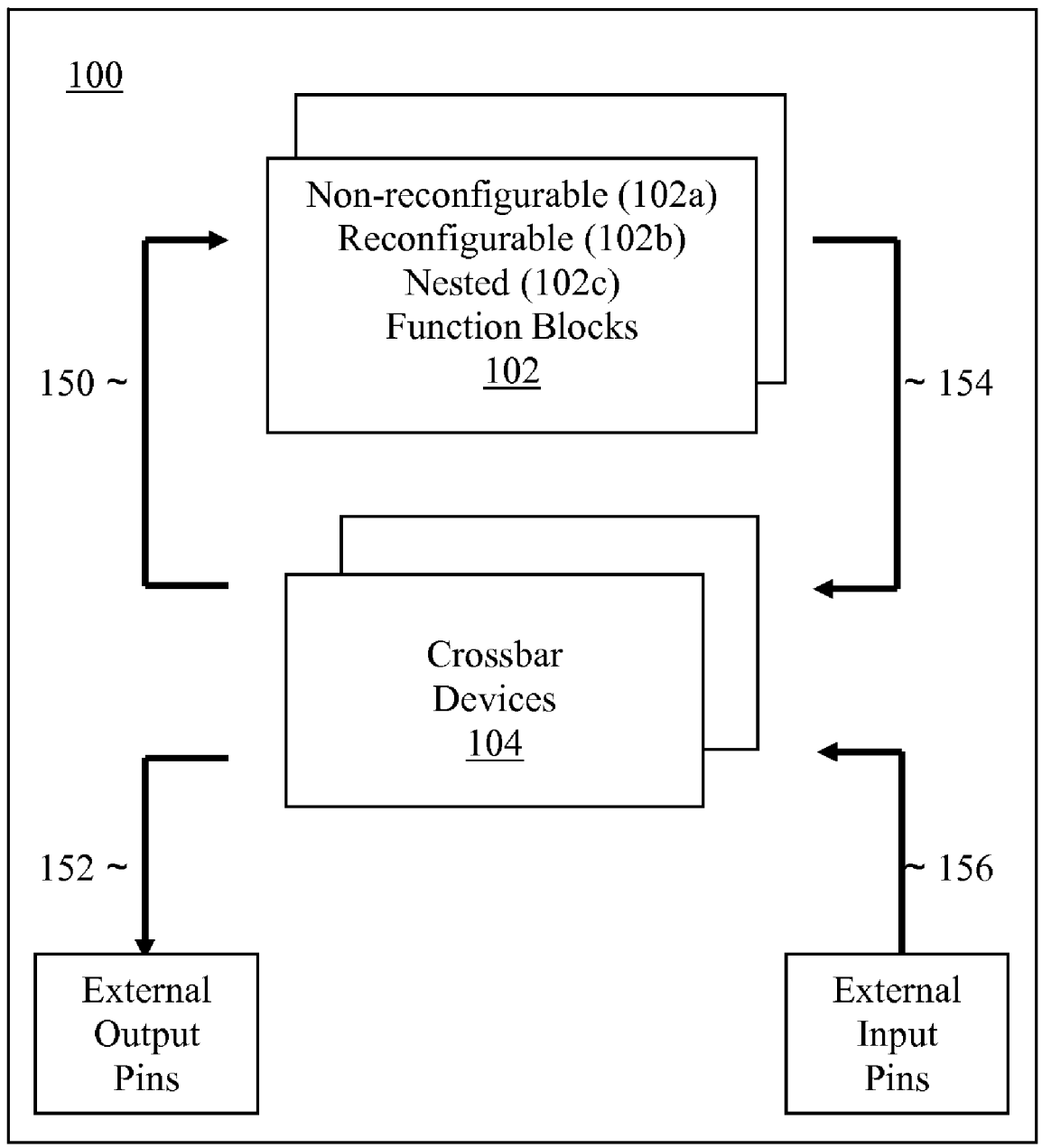
FIGS. 1-2 illustrate an overview of the reconfigurable integrated circuit of the present invention, incorporated with a scalable architecture, in accordance with one embodiment.

Referring now to FIG. 1, wherein a block diagram illustrating an overview of the reconfigurable IC of the present invention (100), in accordance with one embodiment. As illustrated, IC 100 includes a number of function blocks 102 and a number of crossbar devices 104. Further, IC 100 includes a number of external output pins as well as external input pins. Function blocks 102 provide the logic of IC 100, whereas crossbar devices 104 provide the signal routing paths for routing signals into and out of IC 100, as well as in between the function blocks within IC 100. As will be described in more detail below, the elements are advantageously coupled together in accordance with a novel architecture to allow the desired routings to be accomplished in an easily scalable manner, providing more flexibility in trading off area consumption versus routability.

Function blocks 102 may include non-reconfigurable function blocks 102a, reconfigurable function blocks 102b, and/or collections of "nested" function blocks 102c. For examples, function blocks 102 may include non-reconfigurable function blocks 102a, such as processor core, memory controller, bus bridges, and the like. Additionally, or alternatively, function blocks 102 may include reconfigurable function blocks 102b, such as reconfigurable circuitry similar to those found in PLDs or FPGAs, reconfigurable to support alternate functions, such as between supporting the ISA bus or the EISA bus, or between supporting the I2C or SPI serial communication interface, and so forth. The function blocks within a "nested" function block 102c are organized and interconnected together in accordance with the same interconnect architecture for interconnecting function blocks 102, the external inputs and external outputs, and crossbar devices 104 at the IC level (also referred to as the "root" or "highest" or "outermost" level). Each collection of "nested" function blocks may include non-reconfigurable function blocks, reconfigurable function blocks, and/or collections of "nested" function blocks interconnected in accordance with the same interconnect architecture. Eventually, at the "deepest" nesting level (also referred to as the "lowest" or "innermost" nesting level), each of the function blocks are non-reconfigurable function blocks or reconfigurable function blocks, interconnected in accordance with the same interconnect architecture.

Each crossbar device 104 has a fixed number of inputs and a fixed number of outputs. All of its outputs can be routed from any input simultaneously without limitation (this also refers to a fully populated crossbar). Another important characteristic of the crossbar device 104 is that signal is always propagating through it in the same direction (i.e. inputs to outputs). But it can be implemented with any kind of crossbar device architecture like pass transistor bi-directional crossbar device or wired- or unidirectional crossbar device or buffered uni-directional crossbar device. As illustrated in FIG. 1, at the IC level, the elements are coupled to each other in the following manner:

a) A first subset of crossbar devices 104 are routing the external input pins to a first subset of the function block 102 inputs through connections 156 and a first subset of connections 150;

b) In turn, a second subset of crossbar devices 104 are routing a first subset of the function block 102 outputs to a second subset of the function block 102 inputs through a first subset of connections 154 and a second subset of connections 150;

c) further, a third subset of crossbar devices 104 are routing a second subset of the function block 102 outputs to the external output pins through a second subset of connections 154 and connections 152.

Accordingly, all external input pins may be provided to function blocks 102 through the first subset of crossbar devices 104. All internal signals may be routed from one function block 102 to another function block 102 through the second subsets of crossbar devices 104, and all output signals may be routed from function blocks 102 to the external output pins through the third subset of crossbar devices 104.

Note that the first, second, and third subset of crossbar devices 104 may or may not overlap, and each of the three subsets may include the entire collection of the crossbar devices 104. Similarly, the first and the second subset of the function blocks 102 inputs may or may not overlap, and each of the two subsets may include the entire collection of function block 102 inputs. Likewise, the first and the second subset of the function blocks 102 outputs may or may not overlap, and each of the two subsets may include the entire collection of function block 102 outputs.

Figure 2:
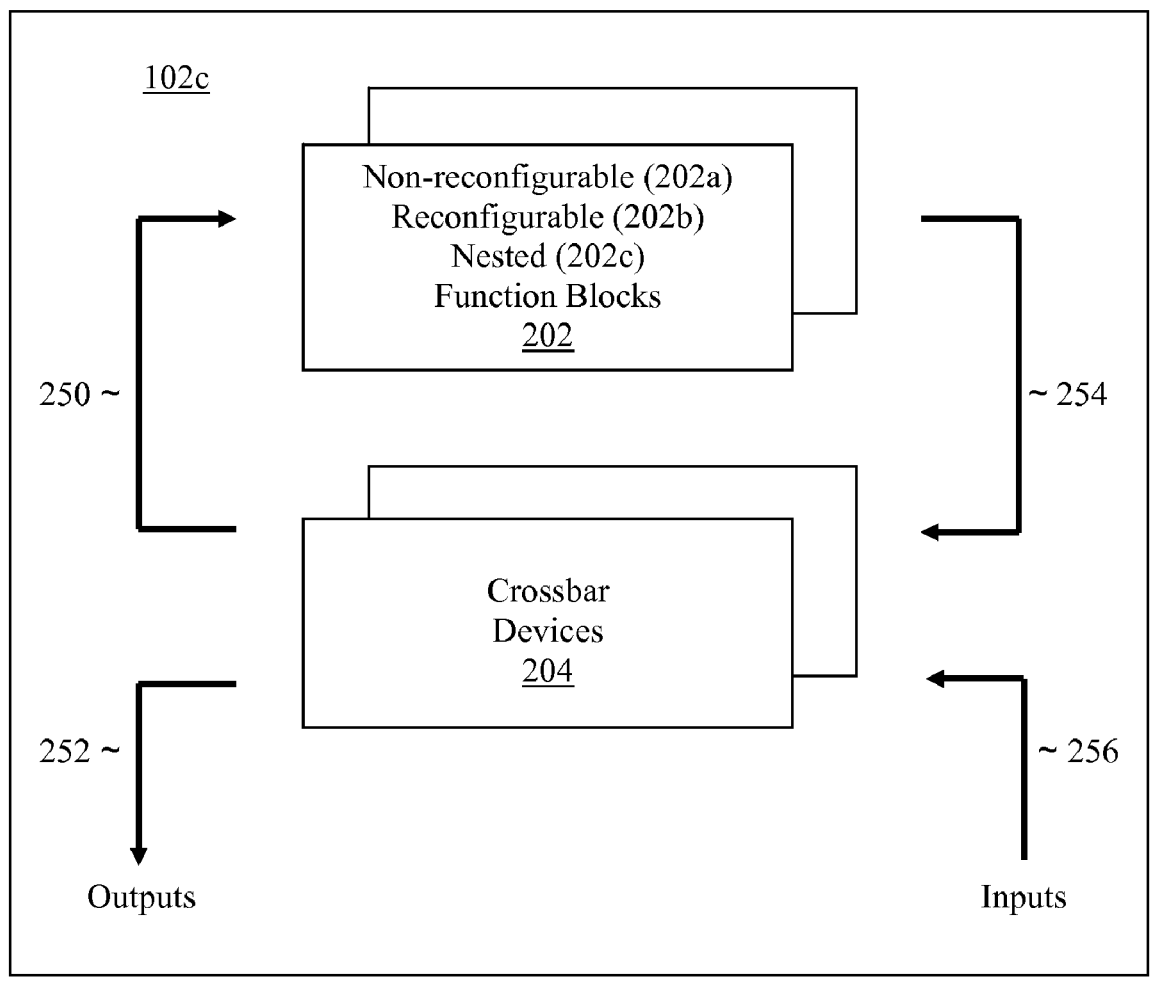

As illustrated in FIG. 2, each collection of nested function blocks 102c includes a number of function blocks 202 (which may be non-reconfigurable function blocks 202a, reconfigurable function blocks 202b, or collections of "nested" function blocks 202c) and crossbar devices. The function blocks 202 topologically occupy analogous positions of function blocks 102 at the IC level, whereas the crossbar devices 204 topologically occupy analogous positions of the crossbar devices 104 at the IC level. The inputs topologically occupy analogous positions of the external input pins at the IC level; and the outputs topologically occupy analogous positions of the external output pins of the IC level. Accordingly, a) A first subset of crossbar devices 204 are routing the inputs to a first subset of the function block 202 inputs through connections 256 and a first subset of connections 250;

b) In turn, a second subset of crossbar devices 204 are routing a first subset of the function block 202 outputs to a second subset of the function block 202 inputs through a first subset of connections 254 and a second subset of connections 250;

c) further, a third subset of crossbar devices 204 are routing a second subset of the function block 202 outputs to the outputs through a second subset of connections 254 and connections 252.

According, all inputs may be provided to function blocks 202 through the first subset of crossbar devices 204. All internal signals may be routed from one function block 202 to another function block 202 through the second subsets of crossbar devices 204, and all output signals may be routed from function blocks 202 to the external outputs through the third subset of crossbar devices 204.

Similar to the IC level, the first, second and third subset of crossbar devices 204 may or may not overlap, and each of the three subsets may include the entire collection of the crossbar devices 204. Similarly, the first and the second subset of the function blocks 202 inputs may or may not overlap, and each of the two subsets may include the entire collection of function block 202 inputs. Likewise, the first and second subset of the function blocks 202 outputs may or may not overlap, and each of the two subsets may include the entire collection of function block 202 outputs.

Each crossbar device 204 is of the same type as the IC level crossbar devices 104.

Accordingly, under the present invention, each of function blocks 102 of the present invention may be recursively expanded to provide better tradeoffs between area consumption versus routability. For implementations of IC 100 requiring relatively small amount of signal routing paths, a handful of crossbar devices and a single level of function blocks may be employed and interconnected in accordance with the interconnect architecture of the present invention. However, for implementations of IC 100 requiring more function blocks, one or more function blocks 102 may be recursively expanded one or more times (with "elements" of each nesting level being interconnected in the same manner as the elements are interconnected at the IC level). Correspondingly, a number of inputs and outputs are provided for the function blocks at each recursion level. Thus, IC 100 of the present invention is highly scalable, and flexible in balancing area consumption, speed and routability.

While for ease of understanding, the above description refers to IC 100 as having external input pins and external output pins, the present invention may be practiced with external pins that are capable only of one of input or output, or with external pins that are configurable to be input or output.

Figure 3:
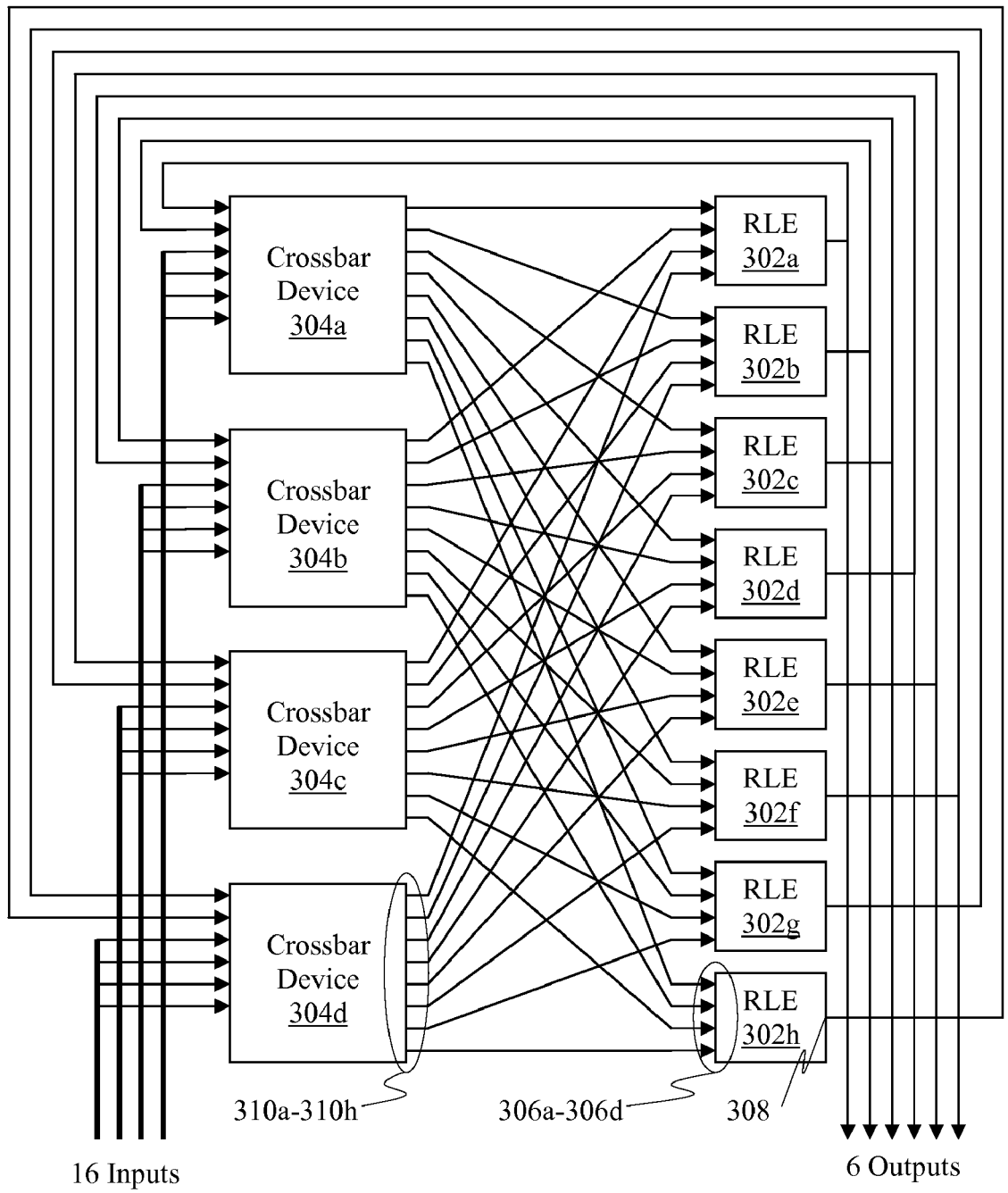
FIG. 3 illustrates a reconfigurable function block in further detail, in accordance with one embodiment.

FIG. 3 illustrates one embodiment of reconfigurable function block 102*b* of FIG. 1 and reconfigurable function block 202*b* of FIG. 2, in further detail. This reconfigurable function block includes a collection of reconfigurable logic elements (RLE). An RLE is an element that can be configured to perform a simple logic function representing few logic gates (typically less than 10) and/or a memorizing function such as a flip flop. For example the simple logic function can be done using a 16-bit RAM used as a 4 inputs 1 output truth table. As illustrated, for the embodiment, reconfigurable function block 102*b* includes m RLE 302*a*-302*h* (m=8) with n inputs 306*a*-306*d* (n=4) and o outputs 308 (o=1), and n crossbar devices 304*a*-304*d* (the number of crossbar devices is equal to the number of RLE inputs) with m outputs 310*a*-310*h* (the number of crossbar device outputs is equal to the number of RLEs). RLEs 302*a*-302*h* are reconfigurable to implement a number of logic functions, whereas crossbar devices 304*a*-304*d* provide flexibility in routing input signals to the RLEs, and routing signals between the RLEs. The outputs of crossbar devices 304*a*-304*d* are coupled to the inputs of each of RLE 302*a*-302*h* (since the number of crossbar outputs equals the number of RLE, each RLE receives one input from each of the crossbars devices), whereas, the outputs of each of RLE 302*a*-302*h* are maximally coupled to the inputs of each of crossbar devices 304*a*-304*d*. That is, if there are n1 outputs from the RLEs and there are n2 crossbar devices, then each RLE output is interconnected to one crossbar device, and the difference between the number of interconnections provided to the crossbar device provided with the most number of interconnections and the number of interconnections provided to the crossbar device provided with the least number of interconnections is 1. For the illustrated embodiment, since there are eight outputs from RLEs 302*a*-302*h* and four crossbar devices 304*a*-304*d*, each crossbar device receives inputs from two RLEs.

The inputs of the reconfigurable function block are directly provided to the inputs of crossbar devices 304*a*-*d* and the outputs of the reconfigurable function block are directly provided by a subset of the RLE outputs (which may include the entire collection of the RLE outputs). In the illustrated embodiment, each of the crossbar devices 304*a*-*d* receives 4 inputs and only 6 RLEs 302*a*-*f* provide outputs.

Note that for ease of illustration, the above description refers to reconfigurable function block 102*b* having 8 RLEs, 6 outputs and 16 inputs. The present invention may be practiced, with the same architecture, having more RLEs, more outputs and more inputs.

Figure 4:
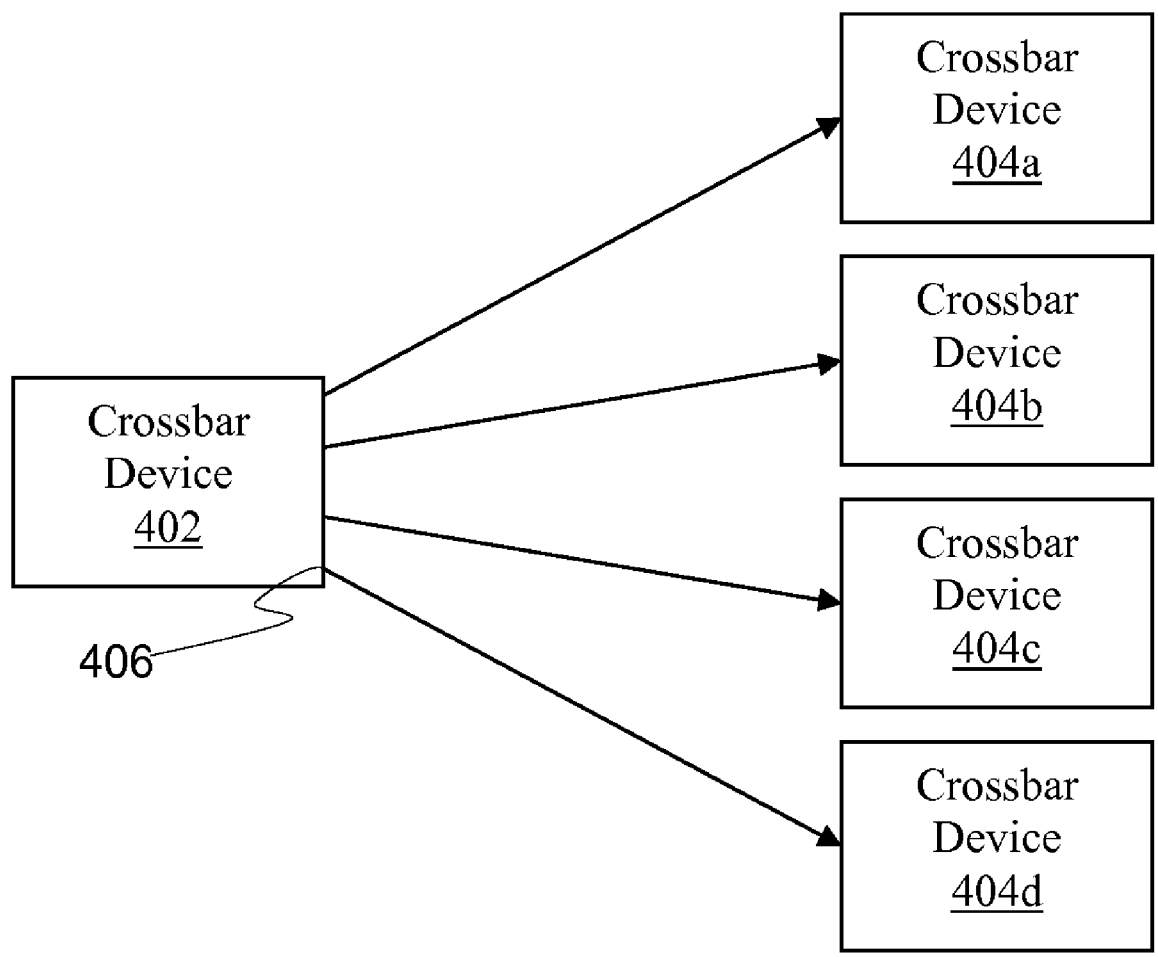
FIG. 4 illustrates interconnections between crossbars, in accordance with one embodiment.

FIG. 4 illustrates the coupling between the crossbar devices of one embodiment of IC 100. When nested function blocks 102*c*/202*c* of IC 100 are totally expanded, IC 100 reduces to a collection of non-reconfigurable function blocks 102*a*/202*a*, reconfigurable function blocks 102*b*/202*b*, crossbar devices, external input pins and external output pins interconnected together. To increase routability of IC 100, preferably a maximum number of different routing paths between function block outputs and function block inputs, between external input pins and function block inputs and between function blocks outputs and external output pins is provided. That is, only one output of crossbar device 402 is connected to each of the other crossbar devices 404*a*-404*d*. Further, to provide a higher speed, the capacitive load of each of the crossbar device outputs should be reduced to the minimum. That is, any crossbar device output 406 is connected to a single crossbar device input. Accordingly, under the present invention, crossbar devices 402 provides inputs to a maximum number of crossbar devices 404*a*-404*d*, therefore maximizing the number of routing paths, while reducing its output capacitive loading to the minimum.

Figure 5:
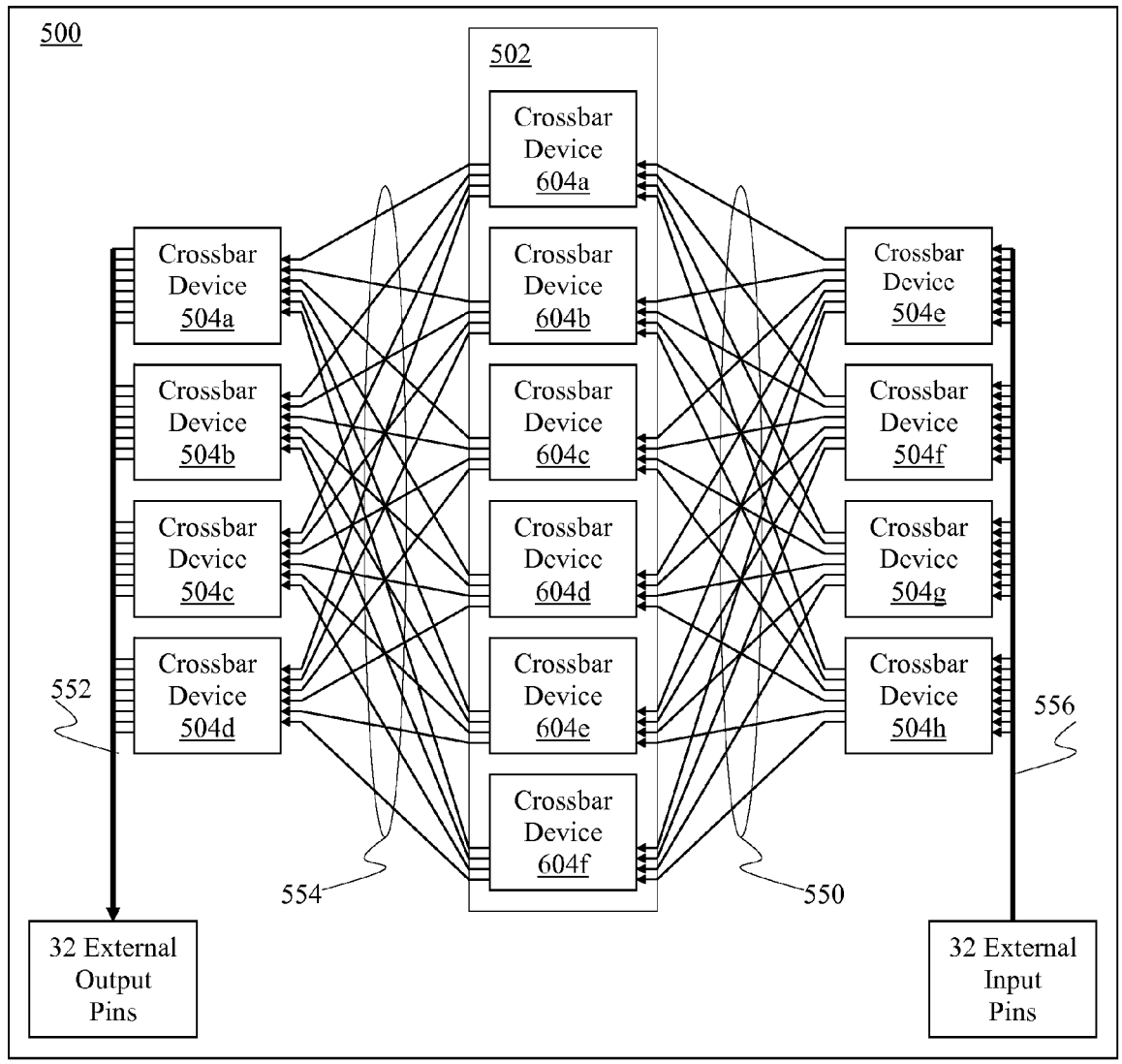
FIGS. 5-7 illustrate one implementation of the reconfigurable IC of FIGS. 1-2 in further detail.
Figure 6:
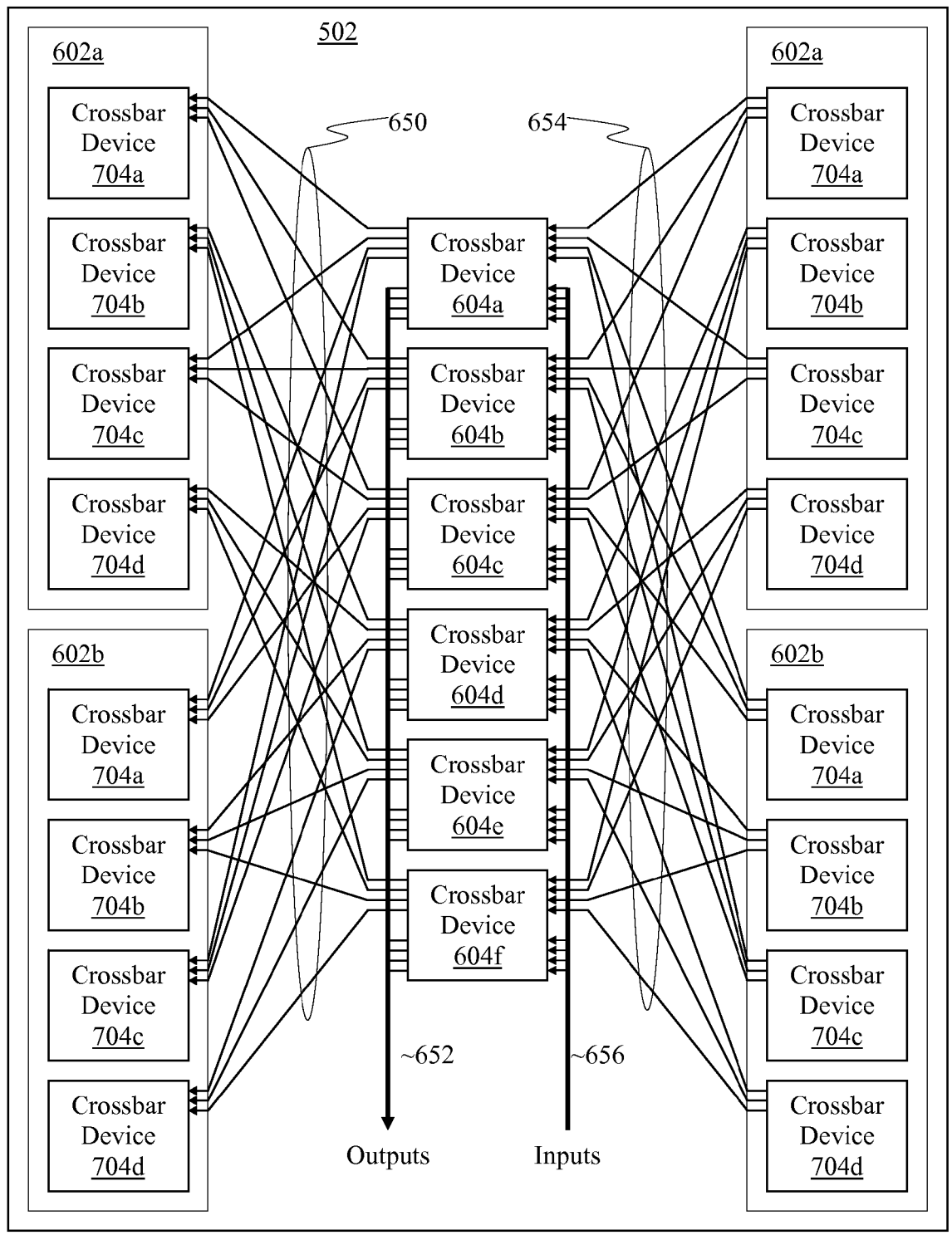
Figure 7:
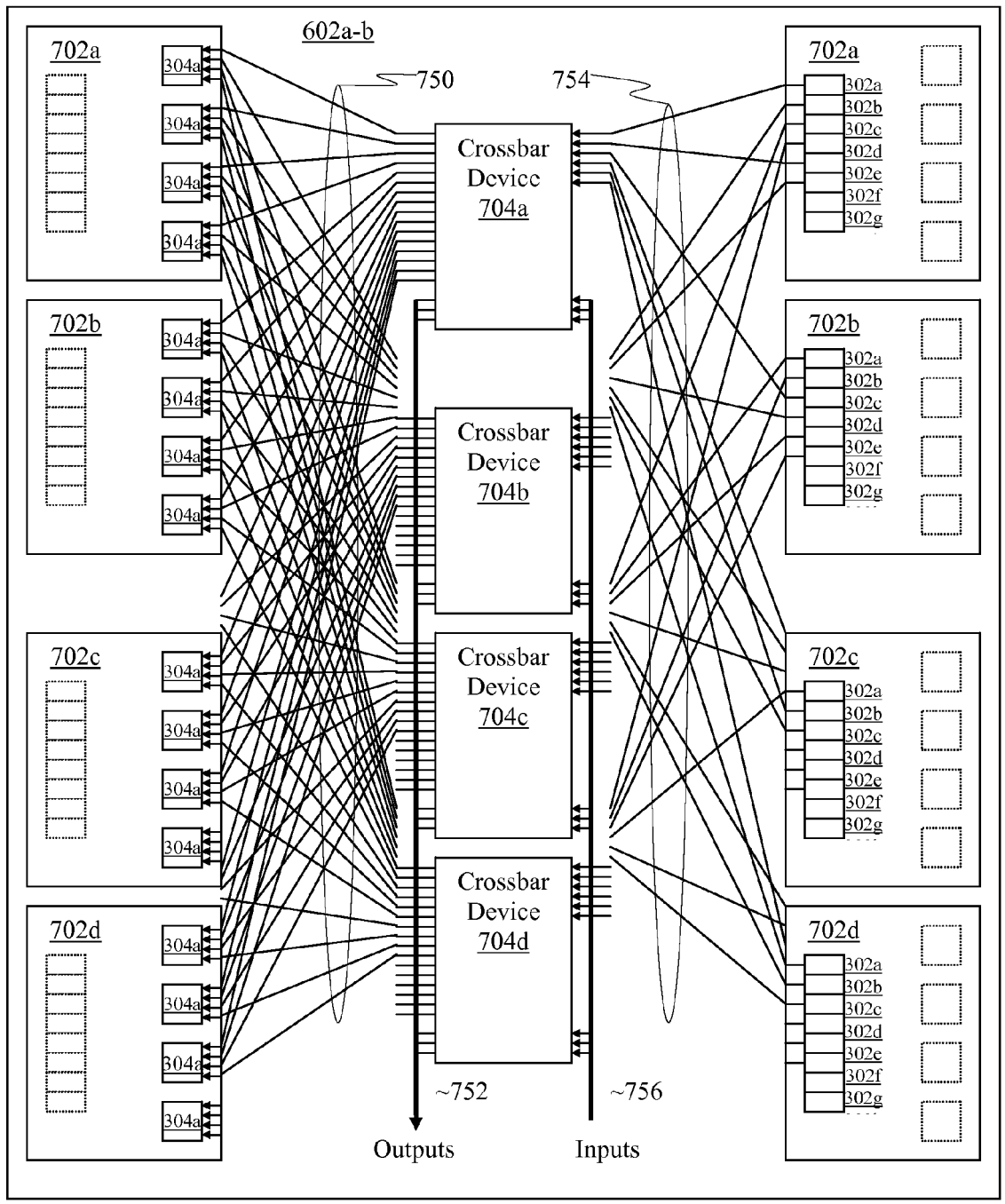

FIGS. 5-7 illustrate an implementation of reconfigurable IC of FIG. 1-2 in further detail. As illustrated, IC 500 includes 1 collection of "nested" function blocks 502, 8 crossbar devices 504*a-h*, 32 external output pins, 32 external input pins and connections 550 552 554 556. Crossbar devices 504*e-h* are the first subset of crossbar devices at the IC level, routing the external input pins to the nested function block 502 inputs through connections 556 and 550. Crossbar devices 504*a-d* are the third subset of crossbar devices at the IC level, routing the nested function block 502 outputs to the external output pins through connections 554 552. In the present implementation, the second subset of crossbar devices at the IC level is empty. Accordingly, the collection of "nested" function blocks 502 topologically occupy the position of function blocks 102 at the IC level, crossbar devices 504*a-h* topologically occupy the position of crossbar devices 104 of the IC level, and connections 550 552 554 556 topologically occupy respectively the position of connections 150 152 154 156 of the IC level. Crossbar devices 604*a-f* are some of the crossbar devices of nested function block 502 (other nested elements of nested function block 502 not shown).

FIG. 6 illustrates one implementation of nested function block collection 502. Nested function block collection 502 includes 2 nested function blocks 602*a-b* (for the purpose of illustration, blocks 602*a-b* are represented two times to clarify the input and output connection pattern), 6 crossbar devices 604*a-f*, 24 inputs, 24 outputs and connections 650 652 654 656. Crossbar devices 604*a-f* are the first, second and third subsets of crossbar devices at the nested function block level, respectively routing the inputs to the function block 602*a-b* inputs through connections 656 650, the function block 602*a-b* outputs to the function block 602*a-b* inputs through connections 654 650 and the function block 602*a-b* outputs to the outputs through connections 654 652. Accordingly, nested function blocks 602*a-b* topologically occupy the positions of function blocks 202 of the nested function block level, whereas crossbar devices 604*a-f* topologically occupy the positions of crossbar devices 204 of nested function block level, and connections 650 652 654 656 topologically occupy respectively the positions of connections 250 252 254 256 of the nested function block level. Crossbar devices 704*a-d* are the crossbar devices of nested function block 602*a-b* (other nested elements of nested function block 602*a-b* not shown).

FIG. 7 illustrates one implementation of nested function blocks 602*a-b*. Nested function blocks 602*a-b* include 4 programmable function blocks 702*a-d* (for the purpose of illustration, blocks 702*a-d* are represented two times to clarify the input and output connection pattern), 4 crossbar devices 704*a-d*, 12 inputs, 12 outputs and connections 750 752 754 756. Crossbar devices 704*a-d* are the first, second and third subsets of crossbar devices at the nested function block level, respectively routing the inputs to the function block 702*a-d* inputs through connections 756 750, the function block 702*a-d* outputs to the function block 702*a-d* inputs through connections 754 750 and the function block 702*a-d* outputs to the outputs through connections 754 752. Accordingly, nested function block 702*a-d* topologically occupy the positions of function blocks 202 of the nested function block level, crossbar devices 704*a-d* topologically occupy the positions of crossbar devices 204 of the nested function block level, and connections 750 752 754 756 topologically occupy respectively the positions of connections 250 252 254 256 of the nested function block level. Programmable function blocks 702*a*-*d* are the same implementation of the programmable function block described above and illustrated in FIG. 3.

Note that each of the crossbar devices of IC 500 has a fixed number of inputs and a fixed number of outputs, and therefore one important characteristic of the present invention is that signal is always propagating through the crossbar devices in the same direction. But the present invention may be practiced with any kind of crossbar device architecture like pass transistor bidirectional crossbar device or wired- or unidirectional crossbar device or buffered unidirectional crossbar device.

Further, all connections between the crossbar devices of IC 500 are done accordingly with the rules disclosed above and illustrated FIG. 4.

Note that for ease of illustration and understanding, IC 500 is purposely illustrated with a small number of elements. However, those skilled in the art will appreciate that IC 500 implementation may be scaled up to realistically represent a commercial product. For example:

a) IC level may include 16 "48-inputs 48-outputs" crossbar devices, 1 first level nested function block, 384 input pins and 384 output pins;

b) first level nested function block may include 48 "32-inputs 48-outputs" crossbar devices, 24 second level nested function block, 384 inputs and 384 outputs;

c) second level nested block may include 16 13-inputs 35-outputs crossbar devices, 8 programmable function blocks, 80 inputs and 48 outputs; and d) programmable function block may include 4 "20-inputs 16-outputs" crossbar devices, 16 "4-inputs 1-output" RLEs, 64 inputs and 16 outputs.

Accordingly, IC has 3092 RLEs, 384 external output pins and 384 external input pins.

Figure 8:
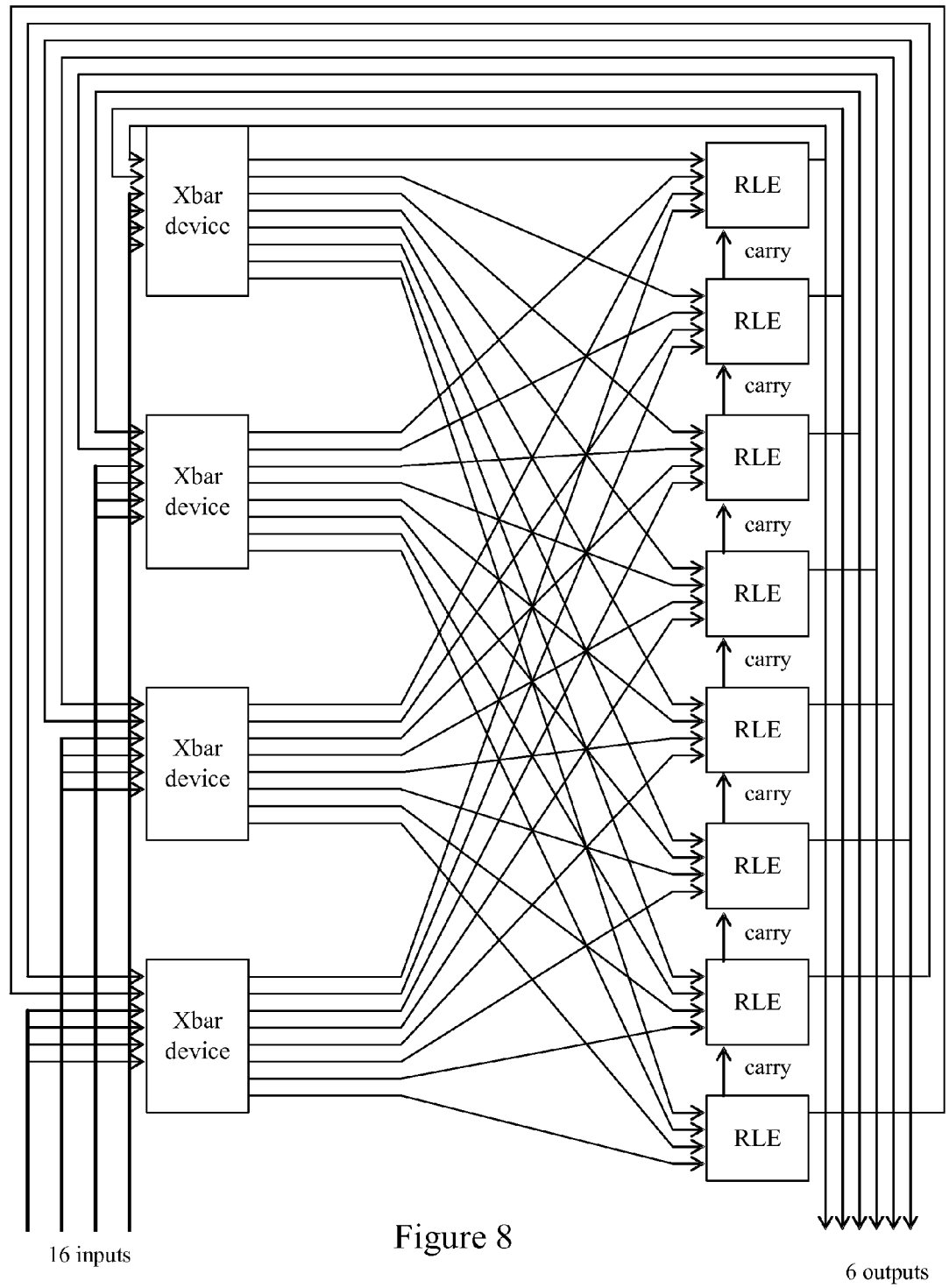
FIG. 8 illustrates a reconfigurable function block with a carry chain.

Reconfigurable ICs such as those described above may under some circumstances be configured to include arithmetic logics such as adders. Adders can be often implemented using ordinary reconfigurable logic but the management of the carry makes them somewhat inefficient both in term of space (e.g., a lot of RLEs are typically necessary) and in term of speed (e.g., carry propagation is typically long). One way to address this inefficiency is to implement a specific carry chain, which may provide some improvement both in terms of space and speed. For example, FIG. 8, depicts a function block that is similar to the function block 102*b*/202*b* of FIG. 3 but with a carry chain. However, using such a hardwired carry chain may impose a constraint on the order of the bits of the RLEs. This may be a problem when there are no output crossbar devices as depicted in FIG. 8. As a result, order constraints may be propagated to a higher level, decreasing the overall efficiency of, for example, the place and route process.

Figure 9:
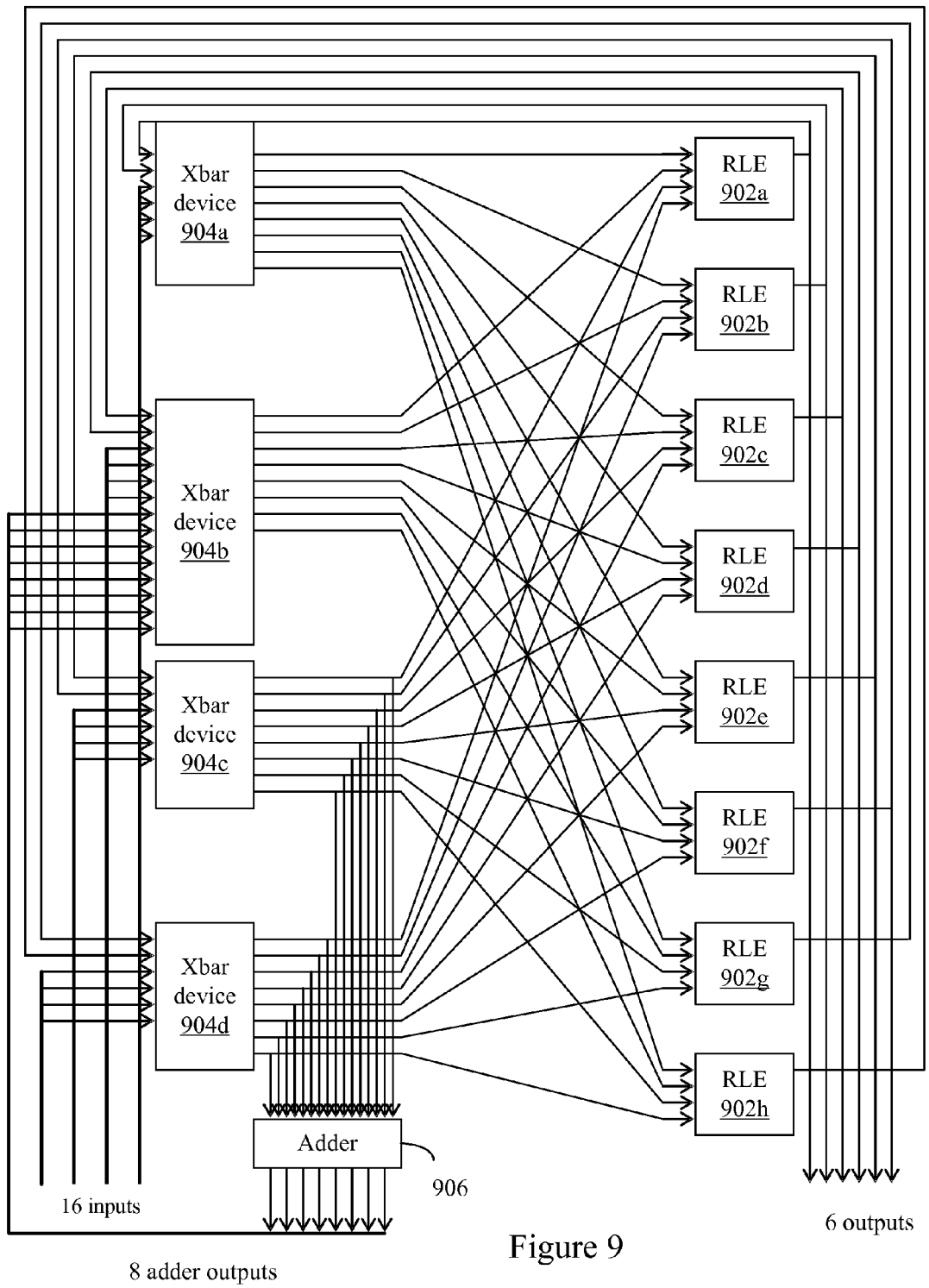
FIG. 9 illustrates a reconfigurable function block with an adder, in accordance with various embodiments.

Alternative to the embodiment depicted in FIG. 3, FIG. 9 depicts the reconfigurable function block 102*b* of FIG. 1 and reconfigurable function block 202*b* of FIG. 2 in accordance with various embodiments. The function block has similar components (e.g., RLEs, crossbar devices, inputs/outputs) as the function block depicted in FIG. 3, all performing similar functions and having similar relationships as previously described. However, the function block further includes an adder 906 that is coupled to the crossbar devices 904*b*-904*d* and RLEs 302*a*-302*h* as shown. In particular, the inputs of the adder 906 are coupled to the outputs of two of the crossbar devices 904*c*-904*d*, while the outputs of the adder 906 are coupled to the crossbar device 904*b*. For purposes of this description, the crossbar device 904*b* may be referred to as an augmented crossbar device (i.e., additional inputs) while crossbar devices 904*c*-904*d* may be referred to as the non-augmented crossbar devices. For the embodiment, the width of the adder 906 as defined by the number of adder 906 outputs may be the same as the number of RLEs 902*a*-902*h*. In various embodiments, the adder 906 may have twice as many inputs as the number of outputs.

One exemplary way of using such an adder is to configure the crossbar device 904*b* to transmit to the RLEs 902*a*-902*h* the outputs of the adders, to configure the crossbar devices 904*c* and 904*d* to transmit the adequate inputs to the adders, and to configure the RLEs 902*a*-902*h* to transparently copy their $2^{nd}$ input—the one connected to the crossbar device 904*b*—to their output. Doing this makes this logic behave as in FIG. 8 except that the order of the carry chain can be arbitrary and is determined by the configuration of matrices 904*b*, 904*c* and 904*d*, actually suppressing any order constraint to the higher hierarchy levels.

Note that similar to the other embodiment previously described (e.g., FIG. 3), in alternative embodiments, the actual number of crossbar devices, RLEs, and their inputs/outputs may be greater than that depicted in FIG. 9. Further, additional adders may also be included in other embodiments.

Reconfigurable ICs such as those described above may under some circumstances be configured to include further special function elements (SFE) such as, for example, various mathematical operators (e.g., subtraction, trigonometric functions, division, multiplication, addition, among others), arithmetic logic units, floating point units, memory arrays, special logic functions, multiplexing, shifters, etc. Many of these types of elements are sometimes known to be implemented using general purpose configurable logic functions, but when implemented in this manner, may be large and slow. Providing SFEs in reconfigurable ICs such as those described herein may allow for implementation of specialized functions in addition to the general logic functions.

Figure 10:
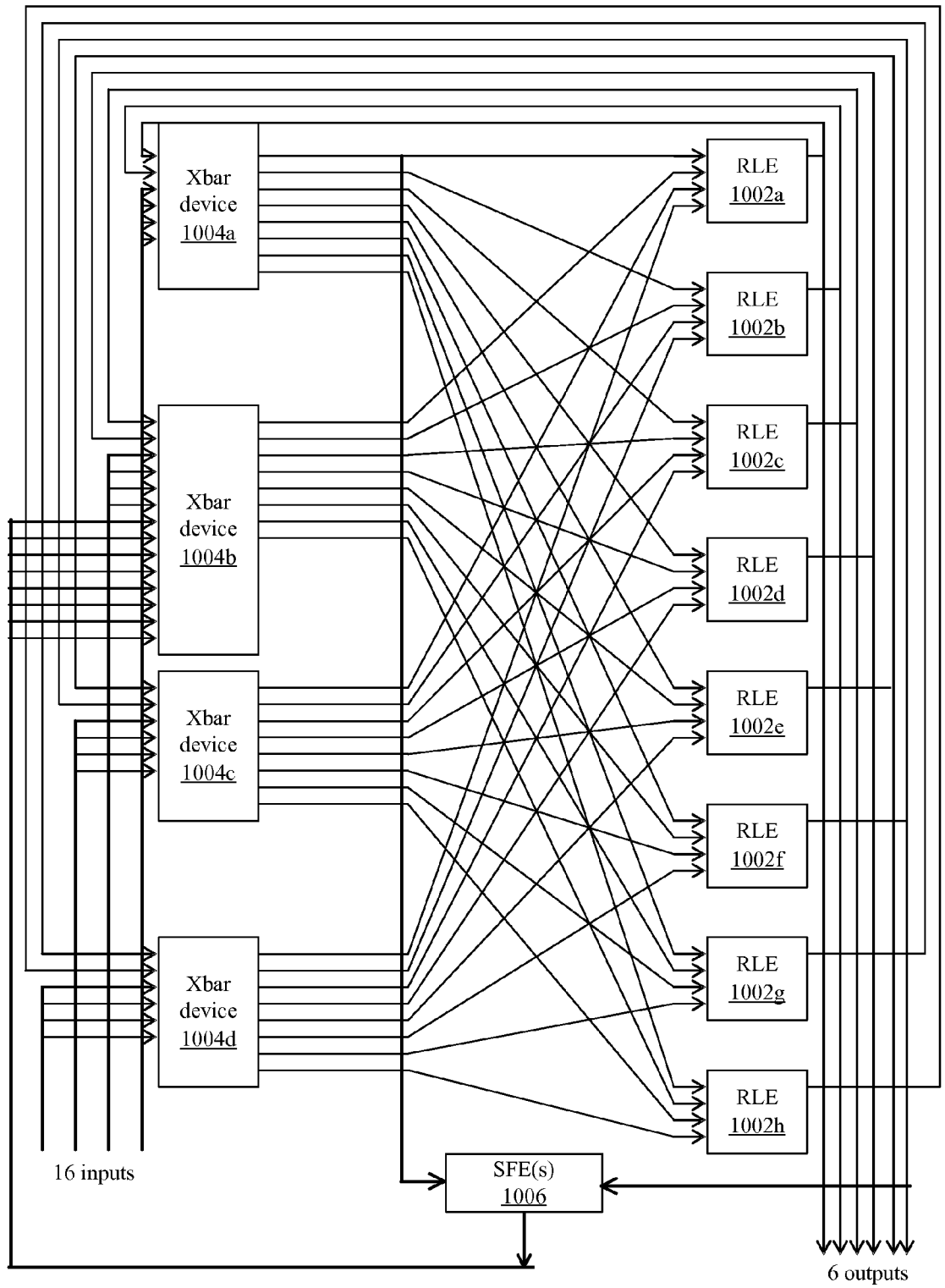
FIG. 10 illustrates a reconfigurable function block including a plurality of special function elements (SFE), in accordance with various embodiments.

Alternative to the embodiment depicted in FIG. 3, FIG. 10 depicts the reconfigurable function block 102*b* of FIG. 1 and reconfigurable function block 202*b* of FIG. 2 in accordance with various embodiments. The function block has similar components (e.g., RLEs, crossbar devices, inputs/outputs) as the function block depicted in FIG. 3, all performing similar functions and having similar relationships as previously described. However, the function block further includes a plurality of SFEs 1006 that are coupled to the crossbar devices 1004*a*-1004*d* and RLEs 1002*a*-1002*h* as shown. In particular, one or more of the inputs of the SFEs 1006 are coupled to one or more outputs of the crossbar devices 1004*a*-1004*h*, while one or more of the outputs of the SFEs 1006 are coupled to the inputs of the crossbar devices 1004*a*-1004*d*. Additionally, one or more of the inputs of the SFEs 1006 also are coupled to one or more of the outputs of the RLEs 1002*a*-1002*h*.

While for ease of understanding, the above description refers to the SFEs 1006 being coupled to both the one or more outputs of the RLEs 1002*a*-1002*h* and to the one or more outputs of the crossbar devices 1004*a*-1004*d*, other embodiments may be possible. In some embodiments, for example, SFEs 1006 may be coupled to the one or more outputs of the RLEs 1002*a*-1002*h*, while not coupled to the crossbar devices 1004*a*-1004*d*. Alternatively, SFEs 1006 may be coupled to the one or more outputs of the crossbar devices 1004*a*-1004*h*, while not coupled to the one or more outputs of the RLEs 1002*a*-1002*h*. A function block may sometimes include both SFEs 1006 coupled to the one or more outputs of the RLEs 1002a-1002h, while not coupled to the crossbar devices 1004a-1004d, and also SFEs 1006 coupled to the one or more outputs of the crossbar devices 1004a-1004h, while not coupled to the one or more outputs of the RLEs 1002a-1002h.

Although the illustrated embodiments generally depict SFEs 1006 as being a single SFE 1006, the actual number may be, and typically is, more than one, and may be of different types, e.g. adders, subtractors, memory and so forth. Moreover, any one or more of the SFEs 1006 may comprise at least one or more selection and/or storage elements. In various ones of these embodiments, the additional selection and storage elements may be configured in a cascaded arrangement, to implement a number of selection paths. One or more outputs of the RLEs and one or more outputs of the SFEs may be provided to a first level of selection elements for selection. The selected outputs may then be provided to the inputs of the crossbar devices. In some embodiments, the selected outputs may be further registered, and then the unregistered as well as the registered selected outputs may be provided to inputs of a second level of selection elements. The second selected outputs may be routed to the crossbar devices or go through additional selection as early described.

An exemplary way of using SFEs 1006 is to configure the crossbar device 1004b to transmit to the SFEs 1006 one or more of the outputs provided to the inputs of one or more of the RLEs 1002a-1002h, depending at least in part on the function being implemented. In some embodiments, for example, the crossbar device 1004b may be configured to transmit to the SFEs 1006 only a subset of the one or more of the outputs provided to the inputs of one or more of the RLEs 1002a-1002h.

Figure 11:
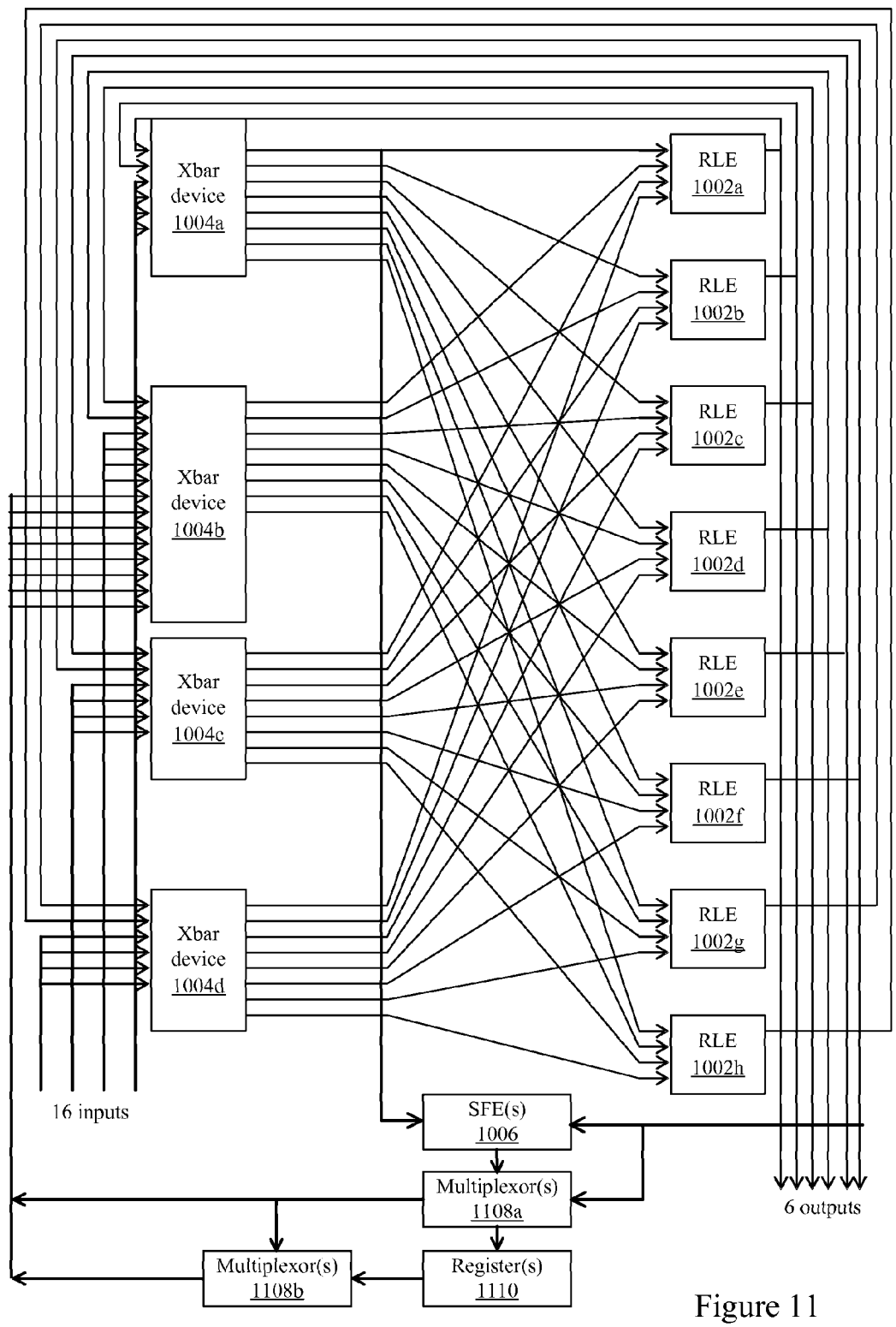
FIG. 11 illustrates an implementation of the reconfigurable function block of FIG. 10 with cascaded selection paths, in accordance with various embodiments.

An exemplary implementation of the reconfigurable function block of FIG. 10 with post SFE selection is illustrated in FIG. 11. FIG. 11 depicts the reconfigurable function block further including a plurality of multiplexors 1108a coupled to one or more outputs of the RLEs 1002a-1002h and one or more outputs of the SFEs 1006. The multiplexors 1108a are configured to selectively couple the one or more outputs of the RLEs 1002a-1002h or the one or more outputs of the SFEs 1006 to one or more inputs of the crossbar devices 1004a-1004d.

In various embodiments, if the one or more outputs of the SFEs 1006 are selected by the multiplexors 1108a, the one or more outputs of the SFEs 1006 may be optionally registered in one or more registers 1110, in addition to outputting the one or more outputs of the SFEs 1006 to the one or more inputs of the crossbar devices 1004a-1004d.

The reconfigurable function block may include one or more other multiplexors 1108b, coupled to multiplexors 1108a and the registers 1110. In some embodiments, the multiplexors 1108a, 1108b may be controllable by a single control signal, while in various other embodiments, they may be individually controllable. The multiplexors 1108b may be configured to selectively couple the selected ones of the one or more outputs of the RLEs 1002a-1002h or the one or more outputs of the SFEs 1006, without intermediate storage, or the stored ones of the selected one or more outputs of the RLEs 1002a-1002h or one or more outputs of the SFEs 1006, to the one or more inputs of the crossbar devices 1004a-1004d.

In various ones of these embodiments, the reconfigurable function block may be operative in at two different modes. In at least a first mode, the multiplexors 1108a, 1108b may be configured to select the outputs of the RLEs 1002a-1002h, ignoring the output of the SFEs 1006. In this mode, the functionality of the reconfigurable function block may operatively similar to the embodiments illustrated in FIG. 3. In at least a second mode, the multiplexors 1108a, 1108b may be configured to select the outputs of the SFEs 1006. In embodiments wherein one or more of the outputs of the RLEs 1002a-1002h are output to one or more inputs of the SFEs 1006, the RLEs 1002a-1002h may effectively be used in combination with the SFEs 1006 to augment the functionality of the SFEs 1006.

The reconfigurable function blocks may be variously configured depending on the particular application. As noted herein, the SFEs 1006 may include a plurality of elements selected from the group consisting at least of various mathematical operators (e.g., subtraction, trigonometric functions, division, multiplication, addition, among others), arithmetic logic units, floating point units, memory arrays, special logic functions, multiplexing, shifters, etc. In some embodiments, any one or more of the SFEs 1006 may comprise one or more lookup tables (LUT). One or more SFEs 1006 may sometimes include, for example, a cascaded arrangement of LUTs for implementing a logic tree.

Moreover, the SFEs 1006 may be reconfigurable or non-reconfigurable, or some combination thereof. The SFEs 1006 may be, for example, configurable between AND and OR logic operations. In some embodiments, the SFEs 1006 may be reconfigurable, but only with restricted configurability.

In some embodiment wherein the SFEs 1006 include a memory array, for example, one or more of memory address signals, control signals, and input data signals may be provided to the memory array by the RLEs 1002a-1002h. The number of RLEs 1002a-1002h needed may depend on any one or more of the size of memory to be implemented, the number of data input ports, the number of control signals, and so on. For example, if the implemented memory is a 32×18 array with two ports (for simultaneous read and write using different addresses, for example), 29 input signals including 5 address bits for each port, 18 input data bits, and one control bit may be provided by 29 RLEs 1002a-1002h. In various embodiments, the data outputs may be selectively coupled to one or more inputs of the crossbar devices 1004a-1004d by one or more of the multiplexors 1108a, 1108b.

In another embodiment, SFEs 1006 may comprise one or more adders. At least in some embodiments, the one or more adder SFE 1006 may be operatively similar to the embodiments depicted in FIG. 9. In particular, the inputs of the adder SFE 1006 are coupled to the outputs of one or more of the crossbar devices 1004a-1004d, while the outputs of the one or more adder SFE 1206 are coupled to the crossbar device 1004b. The one or more adder SFE 1006 may be configured to implement a fast addition function.

Figure 12:
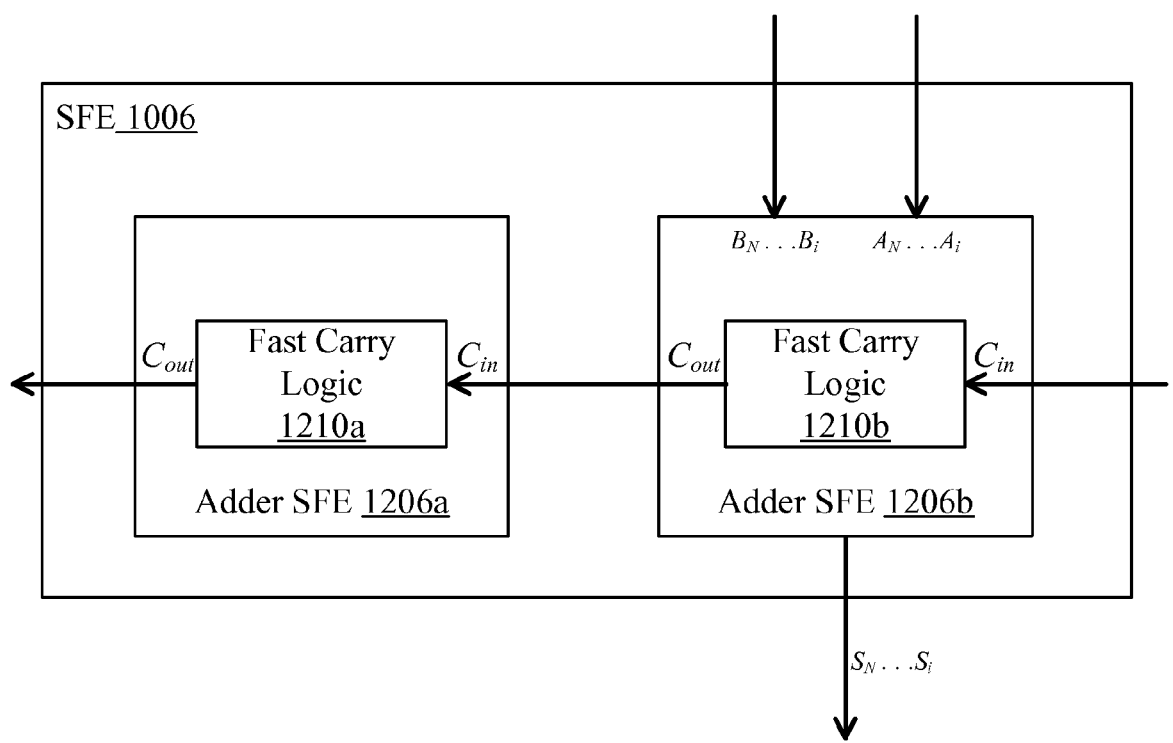
FIG. 12 illustrates an implementation of a SFE of FIG. 11, in accordance with various embodiments.

As illustrated in FIG. 12, for example, the one or more adder SFE 1006 may include at least a first adder SFE 1206a and at least a second adder SFE 1206b, each including one or more fast carry logic blocks 1210a, 1210b. The fast carry logic blocks 1210a, 1210b may be configured to be used in conjunction with the RLEs 1002a-1002h to perform addition on two N-bit numbers, producing an N-bit sum as the result. As an example, two N-bit numbers, A and B, may be provided from the same inputs of the RLEs to at least one of the adder SFEs 1206b, outputting some sum, S.

The fast carry logic blocks 1210a, 1210b may be configured to implement a carry chain, wherein the carry-in, $C_{in}$, of an adder SFE 1206a may be the carry-out, $C_{out}$, of a previous adder SFE 1206b. In some embodiments, the fast carry logic blocks 1210a, 1210b may be configured to implement a carry chain in which the carry-in, $C_{in}$, is a selected one of the carry-out, $C_{out}$, of the previous adder SFE 1206b, 0, or 1.

Figure 13:
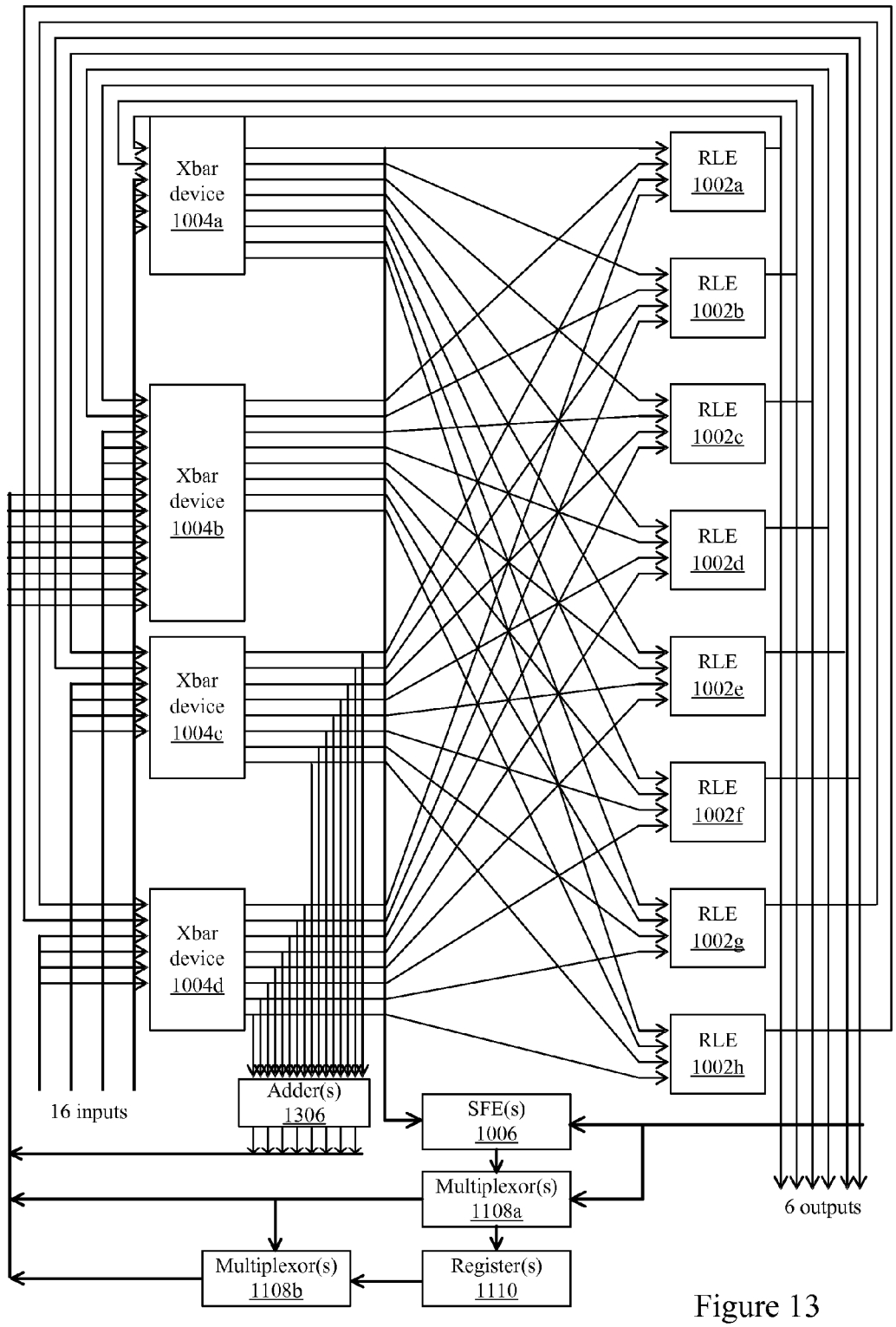
FIG. 13 illustrates another implementation of the reconfigurable function block of FIG. 11 with further detail about one or more adder SFE, in accordance with various embodiments.

Alternative to the embodiment depicted in FIG. 10, FIG. 13 depicts the reconfigurable function block of FIG. 10 in further detail, including in particular, an implementation of one or more of adder SFE 1306, coupled to the crossbar devices 1004a-1004d and RLEs 1002a-1002h as shown. At least in some embodiments, the one or more adder SFE may be operatively similar to the embodiments depicted in FIG. 9. In particular, the inputs of the adder SFE 1306 are coupled to the outputs of two of the crossbar devices 1004a-1004d, while the outputs of the one or more adder SFE 1306 are coupled to the crossbar device 1004b. In some embodiments, the one or more adder SFE 1306 may be configured to implement a fast addition function such as that implemented by the SFE 1006 in FIG. 12.

Note that similar to the other embodiment previously described (e.g., FIG. 3), in alternative embodiments, the actual number of crossbar devices, SFEs, RLEs, inputs/outputs, etc., may be greater than that depicted in FIGS. 10-13. Further, additional adders, multiplexors, registers, etc., may also be included in other embodiments.

Turning now to FIG. 14, illustrated is a flow chart view of selected operations of the reconfigurable function block of FIG. 10 in accordance with various embodiments. In the illustrated embodiment, a plurality of data signals may be reconfigurably routed to a plurality of reconfigurable logic elements as well as a plurality of special logic elements, at 1410. Outputs may be selected from the reconfigurable or special function elements, at 1420. Then, at 1430, the selected outputs may then be reconfigurably routed to the plurality of reconfigurable logic elements as well as the plurality of special function elements.

As described generally herein, reconfigurably routing of a plurality of data signals to a plurality of reconfigurable logic elements as well as a plurality of special function elements as illustrated at 1410 may comprise reconfigurably routing the data signals to a plurality of reconfigurable logic elements as well as a plurality selected from the group consisting of an adder, a subtractor, an arithmetic logic unit, a multiplier, a floating point unit, and a memory array.

In some embodiments, the selection at 1420 may comprise selecting the outputs with a plurality of multiplexors. The outputs may be stored, e.g. in registers, and in some embodiments, the selection at 1420 may comprise selecting by the multiplexors or the stored selected outputs.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   a plurality of reconfigurable logic elements having first inputs and first outputs;
   a plurality of special function elements having second inputs and second outputs, wherein a subset of the first outputs are coupled to the second inputs, and wherein the special function elements include multiple ones selected from the group consisting of a subtractor, an arithmetic logic unit, a multiplier, a floating point unit, a memory array, and an adder that includes one or more fast carry logic blocks; and
   a plurality of crossbar devices having third inputs and third outputs, wherein the plurality of crossbar devices are configured to selectably couple a subset of the third inputs to first or second outputs, and wherein a subset of the third outputs are coupled to the first and second inputs.

2. The apparatus of claim 1, further comprising a plurality of multiplexors coupled to the first and second outputs, and wherein the plurality of multiplexors are configured to selectively couple the first or the second outputs to the subset of the third inputs.

3. The apparatus of claim 2, further comprising a plurality of registers correspondingly coupled to the multiplexors, and wherein the registers are configured to store output signals of selected ones of the first or second outputs.

4. The apparatus of claim 3, further comprising a second plurality of multiplexors coupled to the multiplexors, and wherein the plurality of registers are configured to selectively couple:
   the selected ones of the first or second outputs, without intermediate storage, or
   the stored output values of the selected first or second outputs to the subset of the third inputs.

5. The apparatus of claim 1, wherein the special function elements include a plurality of adders, with each of the plurality of adders having one or more fast carry logic blocks.

6. The apparatus of claim 5, wherein the plurality of adders includes a first adder having first one or more fast carry logic blocks, and a second adder having second one or more fast carry logic blocks, and wherein the first and second carry logic blocks are configured to connect a carry-out of the first adder to a carry-in of the second adder.

7. The apparatus of claim 1, further comprising a plurality of inputs and a plurality of outputs, wherein the plurality of inputs are coupled to a second subset of the third inputs, and wherein the plurality of outputs are coupled to a second subset of the third outputs.

8. The apparatus of claim 1, further comprising a function block comprising the configurable logic elements, the special function elements, and the crossbar devices.

9. The apparatus of claim 8, further comprising another function block similarly constituted as said function block.

10. The apparatus of claim 9, wherein the other function block is nested in said function block.

11. The apparatus of claim 9, further comprising additional crossbar devices coupling the function blocks to each other.

12. The apparatus of claim 11, further comprising a plurality of inputs and a plurality of outputs, wherein the plurality of inputs are coupled to a subset of inputs of the additional crossbar devices, and the plurality of outputs are coupled to a subset of outputs of the additional crossbar devices.

13. The apparatus of claim 1, wherein said apparatus is an embedded logic block of an integrated circuit.

14. The apparatus of claim 1, wherein said apparatus is an integrated circuit.

15. A method comprising:
   reconfigurably routing a plurality of data signals to a plurality of reconfigurable logic elements as well as to a plurality of special function elements, wherein the special function elements include multiple ones selected from the group consisting of a subtractor, an arithmetic logic unit, a multiplier, a floating point unit, a memory array, and an adder having one or more fast carry logic blocks;

selecting outputs from the reconfigurable logic elements or special function elements; and reconfigurably routing the selected outputs to the plurality of reconfigurable logic elements as well as to the plurality of special function elements.

16. The method of claim 15, wherein said selecting comprises selecting by a plurality of multiplexors.

17. The method of claim 16, further comprising storing output signals of the selected outputs.

18. The method of claim 17, further comprising selecting either the outputs selected by the multiplexors, or the stored output signals of the selected outputs.

19. The method of claim 15, wherein a subset of said reconfigurably routed data signals comprises one or more input data signals.

20. The method of claim 15, wherein said reconfigurably routing the selected outputs comprises reconfigurably routing a subset of the selected outputs as output signals.

21. The method of claim 15, wherein said reconfigurably routing a plurality of data signals, said selecting outputs, and said reconfigurably routing the selected outputs are performed in a function block of an apparatus.

22. The method of claim 21, wherein said reconfigurably routing a plurality of data signals, said selecting outputs, and said reconfigurably routing of the selected outputs are collectively performed within each of a plurality of function blocks of an apparatus.

* * * * *